(12) United States Patent
Shen

(10) Patent No.: US 9,987,998 B2
(45) Date of Patent: Jun. 5, 2018

(54) FOLDABLE POSITIONING STRUCTURE FOR BICYCLE RACK AND BICYCLE RACK HAVING THE SAME

(71) Applicant: KING ROOF INDUSTRIAL CO., LTD., Taichung (TW)

(72) Inventor: Shih-Chieh Shen, Taichung (TW)

(73) Assignee: KING ROOF INDUSTRIAL CO., LTD, Taichung (TW)

( * ) Notice: Subject to any disclaimer, the term of this patent is extended or adjusted under 35 U.S.C. 154(b) by 97 days.

(21) Appl. No.: 15/061,404

(22) Filed: Mar. 4, 2016

(65) Prior Publication Data

US 2017/0253188 A1 Sep. 7, 2017

(51) Int. Cl.
*B60R 9/10* (2006.01)
*B60R 9/06* (2006.01)

(52) U.S. Cl.
CPC .................. *B60R 9/10* (2013.01); *B60R 9/06* (2013.01); *Y10S 224/924* (2013.01)

(58) Field of Classification Search
CPC .......... Y10S 224/924; B60R 9/10; B60R 9/06
USPC ................ 224/924, 502, 504, 497, 505–509
See application file for complete search history.

(56) References Cited

U.S. PATENT DOCUMENTS

| | | | | |
|---|---|---|---|---|
| 4,400,129 A * | 8/1983 | Eisenberg | ............ | A61G 3/0209 224/505 |
| 5,363,996 A * | 11/1994 | Raaber | ..................... | B60R 9/06 224/314 |
| 5,449,101 A * | 9/1995 | Van Dusen | ............... | B60R 9/06 224/506 |
| 5,489,110 A * | 2/1996 | Van Dusen | ............... | B60R 9/06 224/507 |
| 5,685,469 A * | 11/1997 | Stapleton | .................. | B60R 9/10 224/505 |
| 7,815,083 B2 * | 10/2010 | Clausen | .................... | B60R 9/06 224/497 |
| 8,210,408 B2 * | 7/2012 | Sautter | ...................... | B60R 9/06 224/497 |
| 2014/0246467 A1 * | 9/2014 | Hein | ........................ | B60R 9/10 224/519 |

* cited by examiner

*Primary Examiner* — Scott McNurlen
(74) *Attorney, Agent, or Firm* — Muncy, Geissler, Olds & Lowe, P.C.

(57) ABSTRACT

A foldable positioning structure for a bicycle rack includes a fixing member movable between first and second positions, an elastic assembly and a controlling assembly for being assembled to the fixing rod. The elastic assembly is assembled to a fixing rod and the fixing member so as to restrict the fixing member in the first position normally. The controlling assembly is movable between third and fourth position relative to the fixing rod and includes a pivot member and a controlling member, the pivot member is assembled to the fixing rod and pivoted to the controlling member, a free end of the controlling member is assembled to the fixing member. The fixing member is selectively restricted or nonrestricted by the movable member so that the movable member is swingable or nonswingable relative to the fixing rod.

10 Claims, 10 Drawing Sheets

FOLDABLE POSITIONING STRUCTURE FOR BICYCLE RACK AND BICYCLE RACK HAVING THE SAME

BACKGROUND OF THE INVENTION

Field of the Invention

The present invention relates to a bicycle rack, and more particularly to a foldable positioning structure for a bicycle rack and the bicycle rack having the same.

Description of the Prior Art

People nowadays like to conduct outdoor activities to relax on weekends. For carrying a bicycle conveniently when going out, people puts the bicycle on a bicycle rack to connect the bicycle rack with an automobile. The conventional bicycle rack has a fixing rod, an end of the fixing rod is pivoted to a connecting rod which is connected with a body of the automobile, the other end of the fixing rod is provided with a supporting rod extending toward a direction lateral to the fixing rod, and the supporting rod is used to assemble and position the bicycle.

However, when the conventional bicycle rack is disassembled from the automobile, the supporting rod protrudes laterally, and a volume of the bicycle rack is great; therefore, it is inconvenient to deposit the bicycle rack no matter in the automobile or indoors.

The present invention has arisen to mitigate and/or obviate the afore-described disadvantages.

SUMMARY OF THE INVENTION

The major object of the present invention is to provide a foldable positioning structure for a bicycle rack and the bicycle rack having the same, through the foldable positioning structure, the bicycle rack can be quickly folded to a smallest volume so that the bicycle rack is convenient to be deposited, and the bicycle rack has a simple structure so that it is easy to be operated.

To achieve the above and other objects, a foldable positioning structure for a bicycle rack is provided. The foldable positioning structure is for a fixing rod and a movable member of the bicycle rack and includes a fixing member, an elastic assembly and a controlling assembly. The fixing member is for being assembled to the fixing rod and movable between a first position and a second position relative to the fixing rod; an end of the elastic assembly is assembled to the fixing rod, the other end of the elastic assembly is assembled to the fixing member so as to restrict the fixing member in the first position normally; and a controlling assembly is for being assembled to the fixing rod and movable between a third position and a fourth position relative to the fixing rod, the controlling assembly includes a pivot member and a controlling member, an end of the pivot member is assembled to the fixing rod, the other end of the pivot member is pivoted to the controlling member, a free end of the controlling member is assembled to the fixing member. When the controlling member is driven to move from the third position to the fourth position, the fixing member moves from the first position toward the second position, the fixing member is free of being restricted by the movable member, and the movable member is swingable relative to the fixing rod; when the controlling member is driven to move from the fourth position to the third position, the elastic assembly forces the fixing member to move from the second position to the first position to positioningly restrict the movable member.

To achieve the above and other objects, a bicycle rack is further provided, including the above-mentioned foldable positioning structure, further including a fixing rod and two movable members. One of two said movable members is pivoted to one of two ends of the fixing rod and provided with a supporting rod for supporting a bicycle, and the other of said movable members is pivoted to the other of the two ends of the fixing rod and provided with a connecting rod, and the connecting rod is for being assembled to an assembling rod of an automobile.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
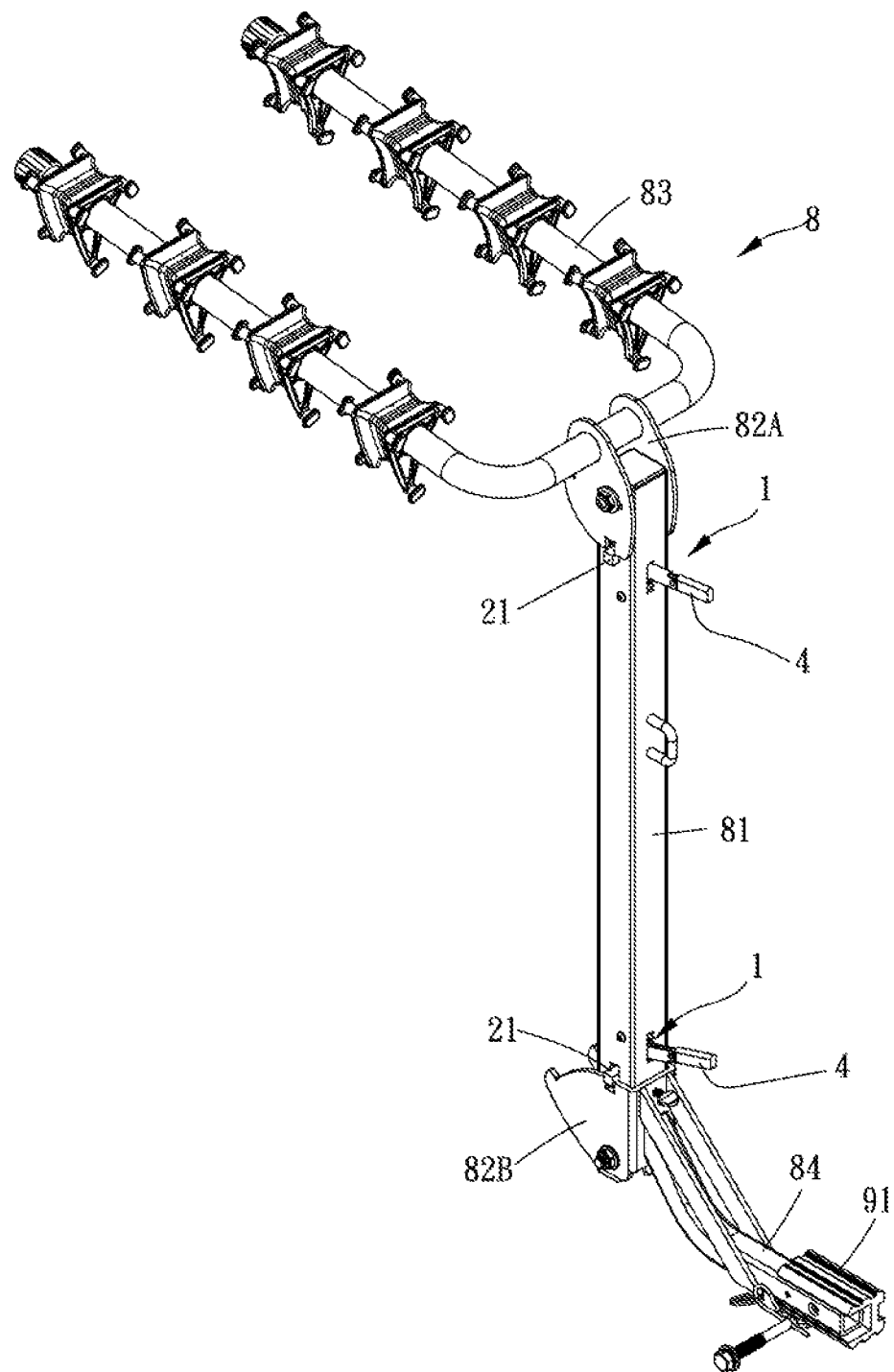
FIGS. 1 and 2 are perspective views of a preferred embodiment of the present invention.
Figure 2:
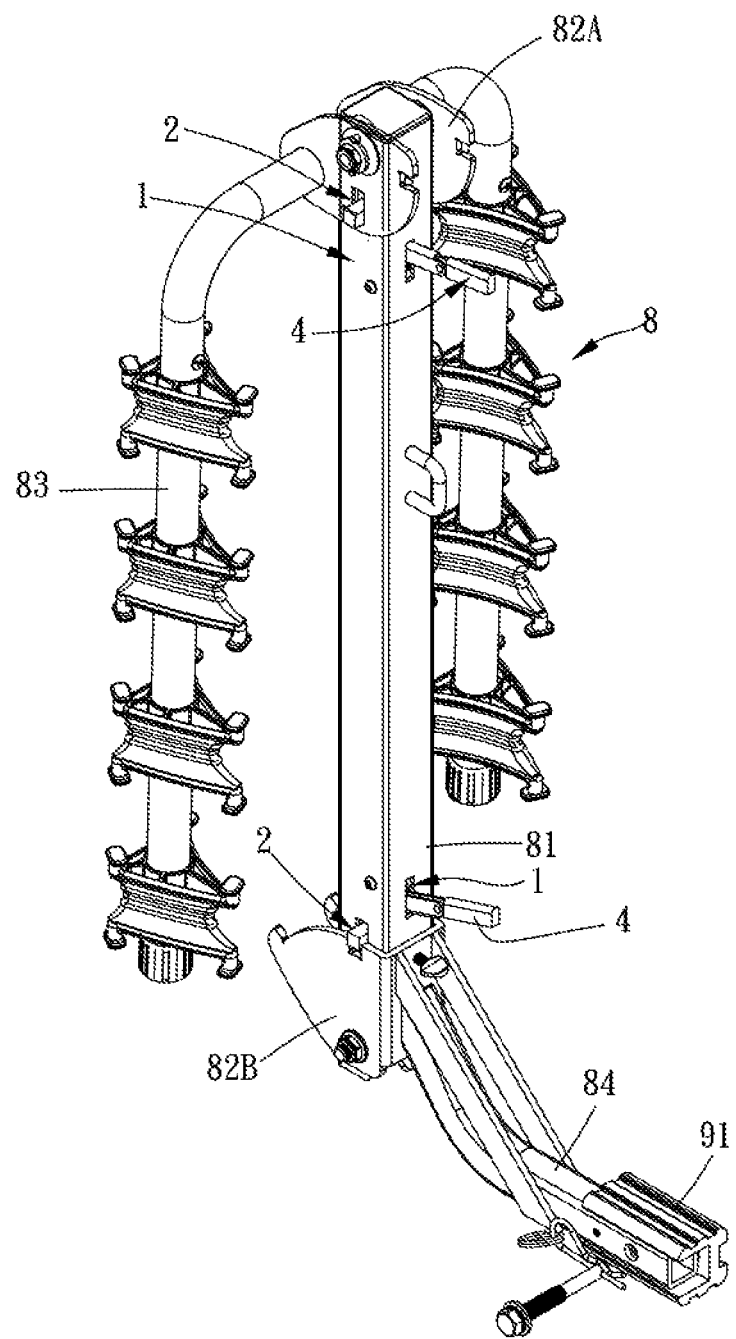
Figure 3:
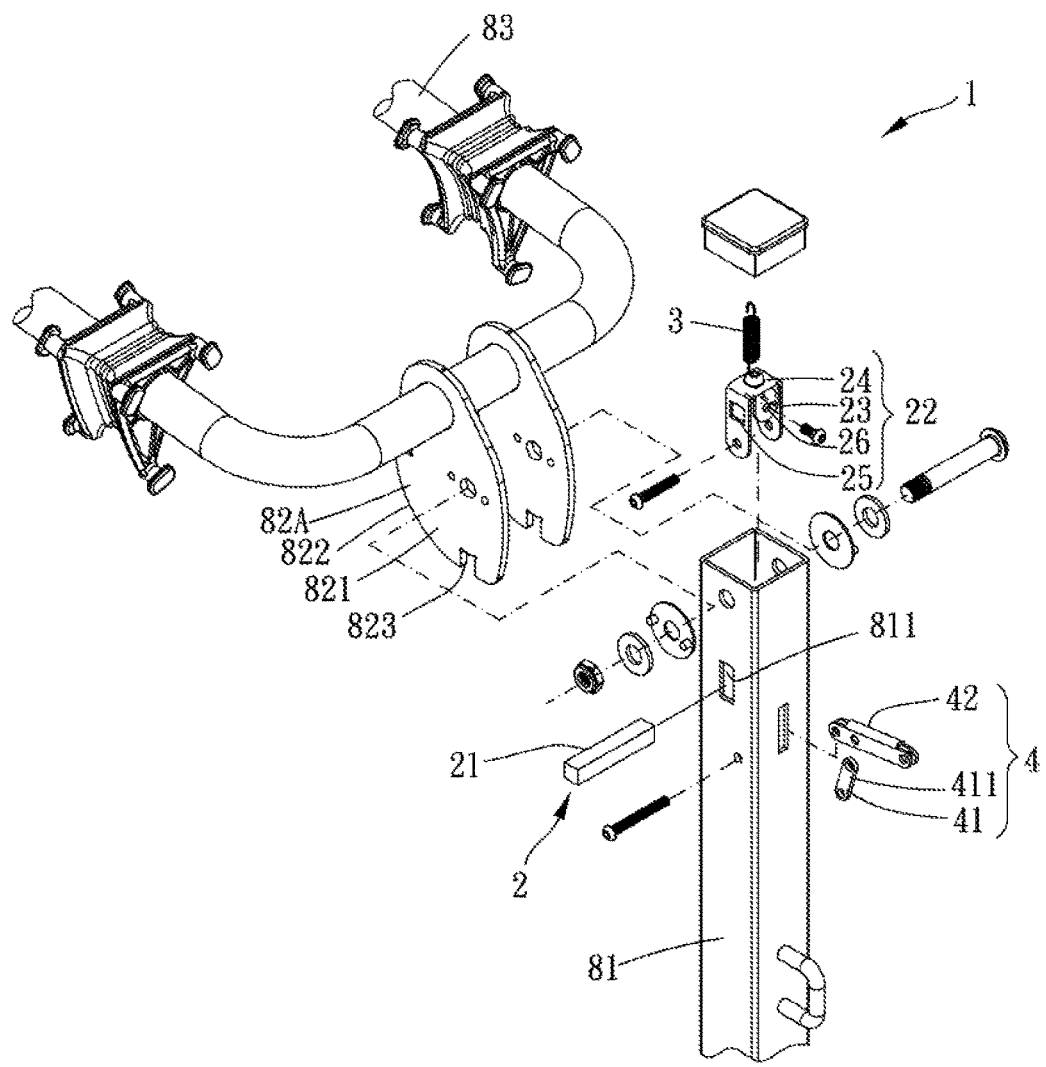
FIG. 3 is a partial breakdown view of the preferred embodiment of the present invention.
Figure 4:
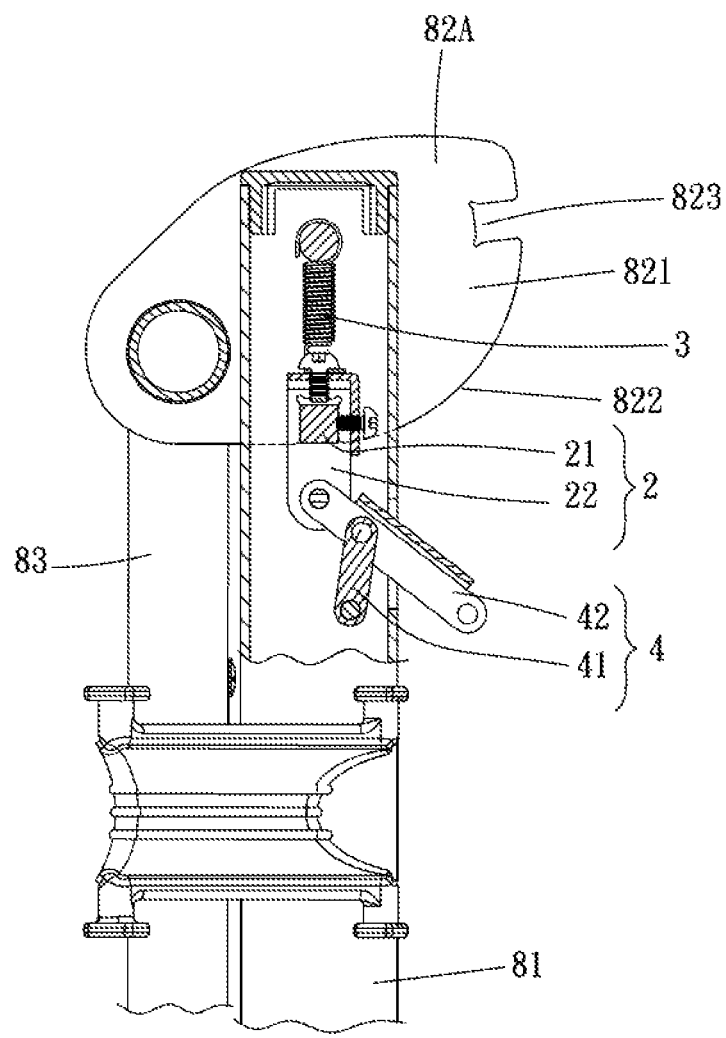
FIGS. 4 to 6 are drawings showing a part of the preferred embodiment of the present invention in operation.
Figure 5:
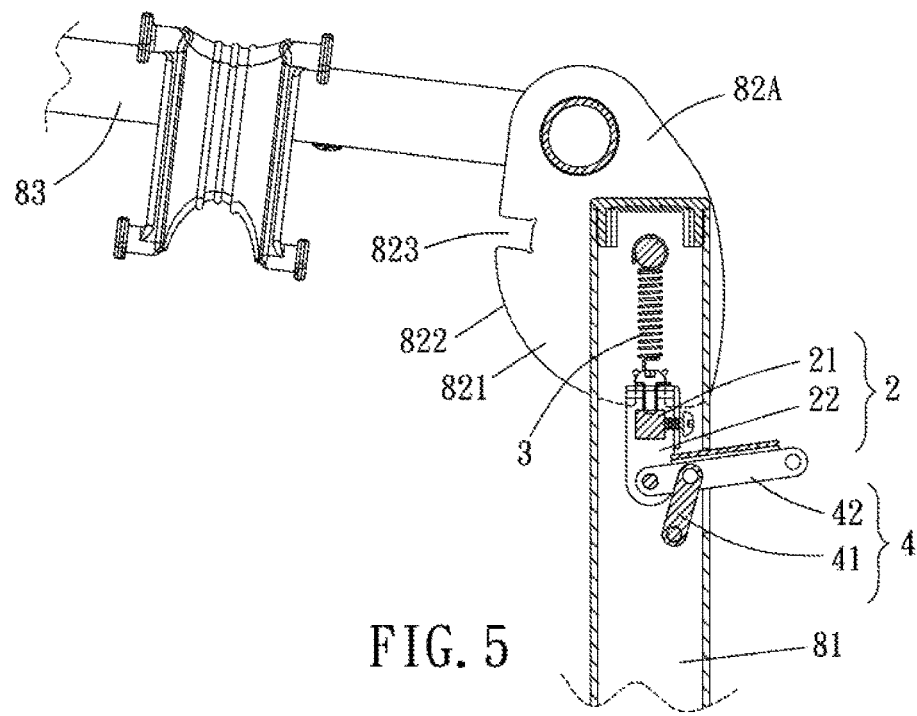
Figure 6:
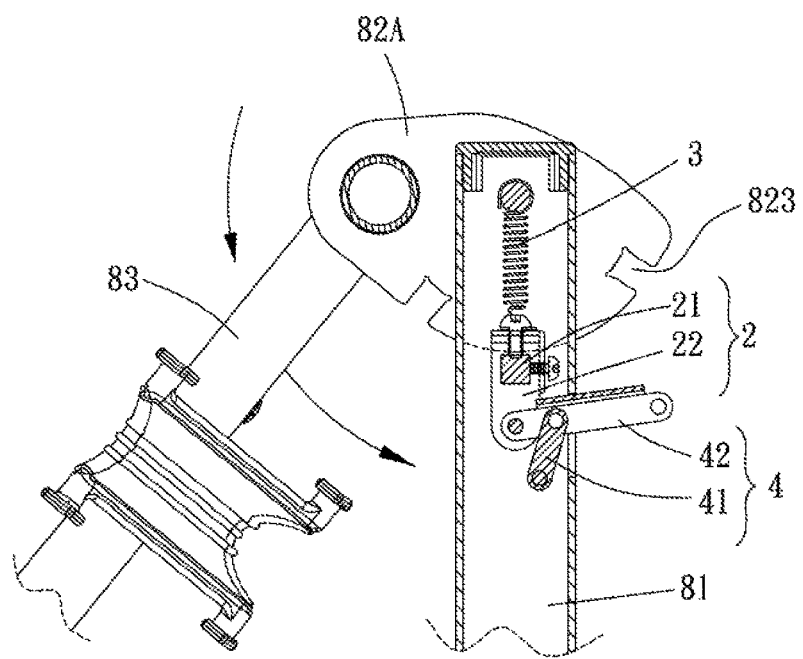

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A foldable positioning structure 1 for a bicycle rack 8 is provided for a fixing rod 81 and a movable member 82A of the bicycle rack 8, the movable member 82A is pivoted to one of two ends of the fixing rod 81 and provided with a supporting rod 83 for supporting a bicycle, and the foldable positioning structure 1 includes a fixing member 2, an elastic assembly 3 and a controlling assembly 4.

The fixing member 2 is for being assembled to the fixing rod 81 and movable between a first position and a second position relative to the fixing rod 81.

An end of the elastic assembly 3 is assembled to the fixing rod 81, and the other end of the elastic assembly 3 is assembled to the fixing member 2 so as to positioningly restrict the fixing member 2 in the first position normally.

The controlling assembly 4 is for being assembled to the fixing rod 81 and movable between a third position and a fourth position relative to the fixing rod 81, the controlling assembly 4 includes a pivot member 41 and a controlling member 42, an end of the pivot member 41 is assembled to the fixing rod 81, the other end of the pivot member 41 is pivoted to the controlling member 42, and a free end of the controlling member 42 is assembled to the fixing member 2.

Thereby, when the controlling member 42 is driven to move from the third position to the fourth position, the fixing member 2 moves from the first position toward the second position, the fixing member 2 is free of being restricted by the movable member 82A, and the movable member 82A is swingable relative to the fixing rod 81; when the controlling member 42 is driven to move from the fourth position to the third position, the elastic assembly 3 forces the fixing member 2 to move from the second position to the first position to positioningly restrict the movable member 82A, and the movable 82A is non-swingable relative to the fixing rod 81. Therefore, via the foldable positioning structure 1, the movable member 82A and the fixing rod 81 can be folded and positioned quickly, and it is convenient and easy to store and operate the bicycle rack 8.

Specifically, the fixing member 2 may further include a reversed U-shaped block 22 and a positioning block 21, two leg sections 23 of the reversed U-shaped block 22 are formed with an assembling hole 25 respectively, and the two assembling holes 25 communicate with each other for the positioning block 21 to be disposed therethrough. The fixing rod 81 is formed with a slide slot 811 penetrating therethrough, and the positioning block 21 is slidably disposed in the slide slot 811. One of said ends of the elastic assembly 3 is for being assembled to an end wall of an end of the fixing rod 81, and the other of said ends of the elastic assembly 3 is assembled to a connection section 24 between the two leg sections 23 of the reversed U-shaped block 22 so as to positioningly restrict the reversed U-shaped block 22 and the positioning block 21 in the first position normally. The reversed U-shaped block 22 is further formed with a fixing sheet 26 perpendicular to the two leg sections 23, and a locking member locks the fixing sheet 26 and the positioning block 21 so as to prevent the positioning block 21 from being disassembled from the reversed U-shaped block 22. It is to be noted that in other embodiments, the fixing member 2 may include the positioning block 21 and be exclusive of the reversed U-shaped block 22. One of said ends of the elastic assembly 3 is for being assembled to an end wall of an end of the fixing rod 18, the other of said ends of the elastic assembly 3 is assembled to the positioning block 21; or the positioning block 21 and the reversed U-shaped block 22 may be integrally formed, and the elastic assembly 3 can still positioningly restrict the positioning block 21 in the first position normally.

Preferably, an end of the controlling member 42 is located in the fixing rod 81 and pivoted to the two leg sections 23 of the reversed U-shaped block 22, and the other end of the controlling member 42 extends outside the fixing rod 81. A user can operate the controlling member 42 from outside of the fixing rod 81 to move the fixing member 2 from the first position to the second position. It is understandable that in other embodiments, an end of the controlling member may be non-assembled to the two leg sections of the reversed U-shaped block but assembled to the positioning block, and the positioning block can still slide from the first position to the second position.

The pivot member 41 is a connecting board 411, an end of the connecting board 411 is pivoted to a portion between two ends of the controlling member 42, the other end of the connecting board 411 is pivoted to an inner wall of the fixing rod 81, the connecting board 411 is swingable relative to the inner wall of the fixing rod 81 and swingable relative to the controlling member 42, the controlling member 42 is swingable and movable relative to the inner wall of the fixing rod 81 so that the controlling member 42 can move from the third position to the fourth position smoothly to move the fixing member 2 from the first position to the second position. In other embodiments, the pivot member 41 may be pivoted to an axle between the controlling member 42 and the fixing rod 81, and the controlling member 42 is still swingable between the third position and the fourth position.

Specifically, in this embodiment, the movable member 82A includes a restriction portion 821, the restriction portion 821 includes a curved section 822 and at least two grooves 823 formed on the curved section 822. In this embodiment, the movable member 82A includes two said grooves 823, when the fixing member 2 is in the first position, the positioning block 21 is received in one said groove 823 to abut against the movable member 82A and to positioningly restrict the movable member 82A from swinging relative to the fixing rod 81; when the fixing member 2 slides to the second position and the positioning block 21 is dislocated from one said groove 823, the positioning block 21 abuts against the curved section 822, the movable member 82A is free of being restricted by the positioning block 21 so as to be swingable relative to the fixing rod 81. When the positioning block 21 slides to another one of said grooves 823, the positioning block 21 is driven by the elastic assembly 3 to be received in the groove 823, the fixing member 2 is positioningly restricted in the first position. Therefore, the elastic assembly 3 can prevent the positioning block 21 from being dislocated from the groove 823 so as to prevent the fixing rod 81 from swinging relative to the movable member 82A.

Please further refer to FIGS. 7 to 11. The bicycle rack 8 is further provided, including the above-mentioned foldable positioning structure 1, and further including the fixing rod 81 and two movable members 82A, 82B. One said movable member 82A is pivoted to one of two ends of the fixing rod 81 and provided with a supporting rod 83 for supporting a bicycle, the other of said movable member 82B is pivoted to the other of the two ends of the fixing rod 81 and provide with a connecting rod 84, and the connecting rod 84 is for being assembled to an assembling rod 91 of an automobile 9. Specifically, in this embodiment, the bicycle rack 8 includes two said foldable positioning structures 1, the two foldable positioning structures 1 are disposed on two said ends of the fixing rod 81 respectively, and the two foldable positioning structures 1 are for folding and positioning the fixing rod 81 and the two movable members 82A, 82B respectively. Therefore, the bicycle rack 8 can be folded quickly and stored conveniently.

Figure 7:
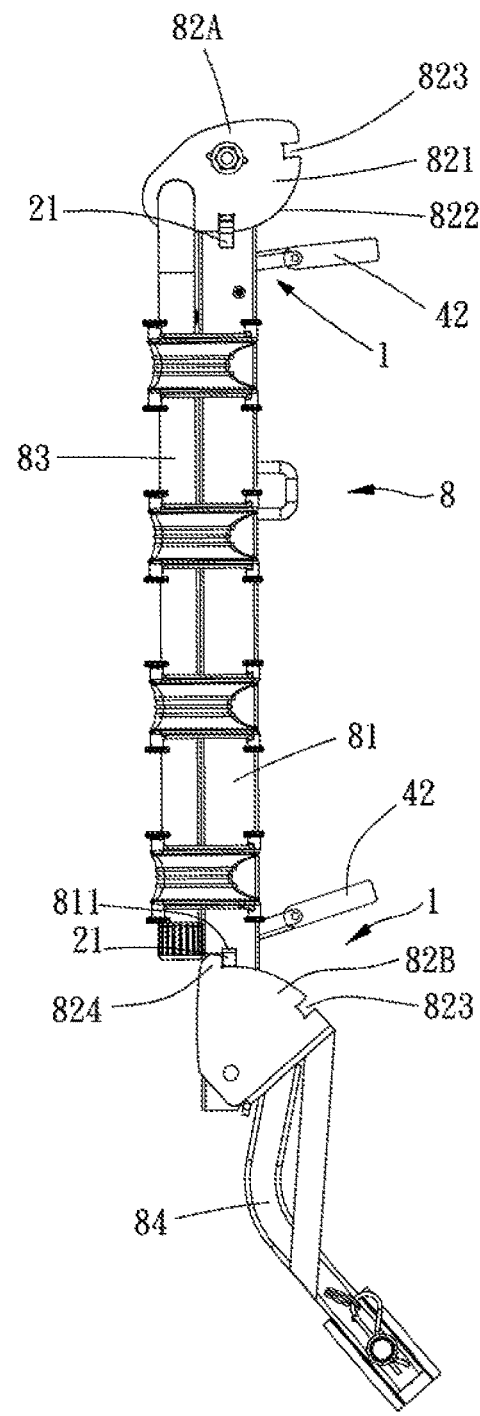
FIG. 7 is a side view of the preferred embodiment of the present invention.
Figure 8:
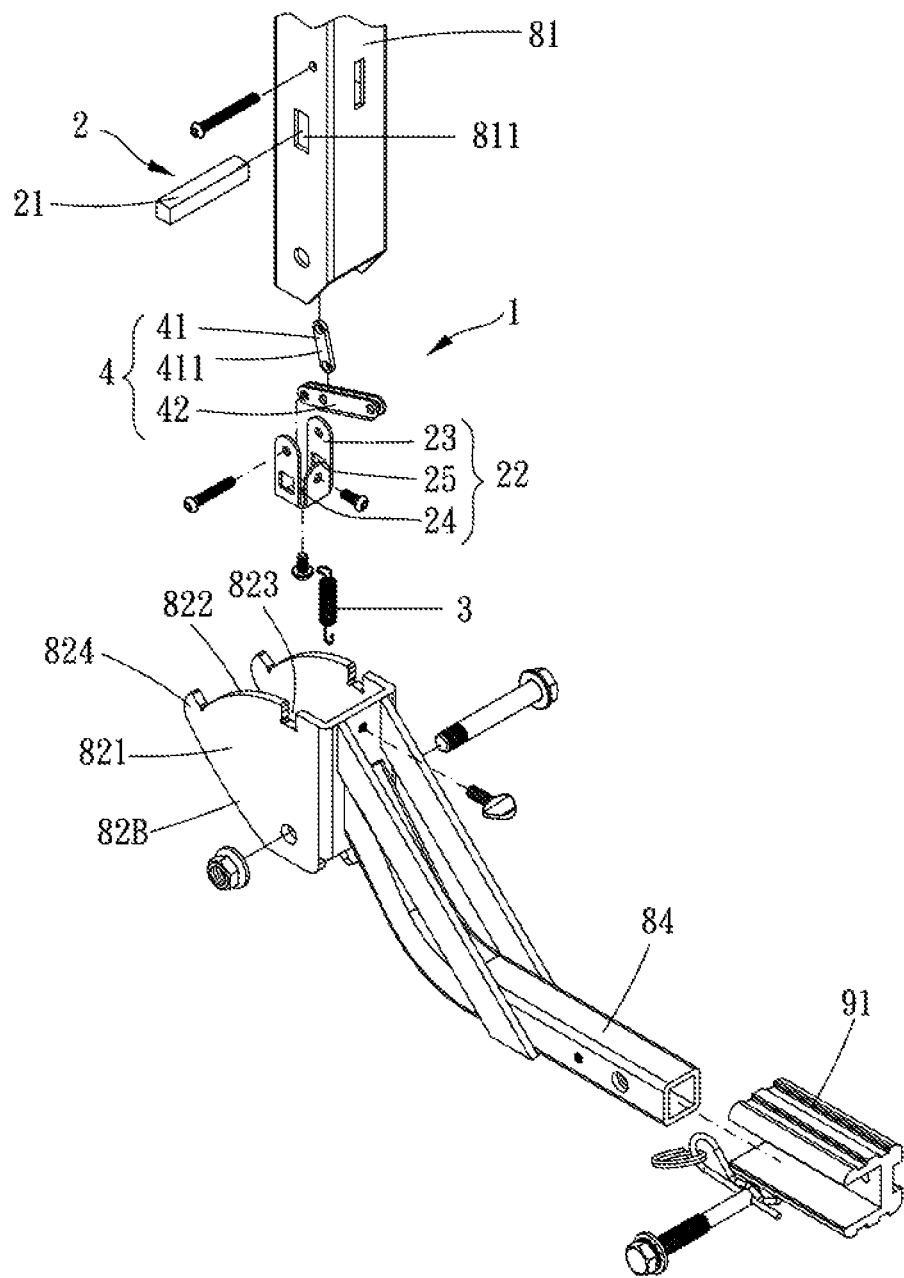
FIG. 8 is another partial breakdown view of the preferred embodiment of the present invention.
Figure 9:
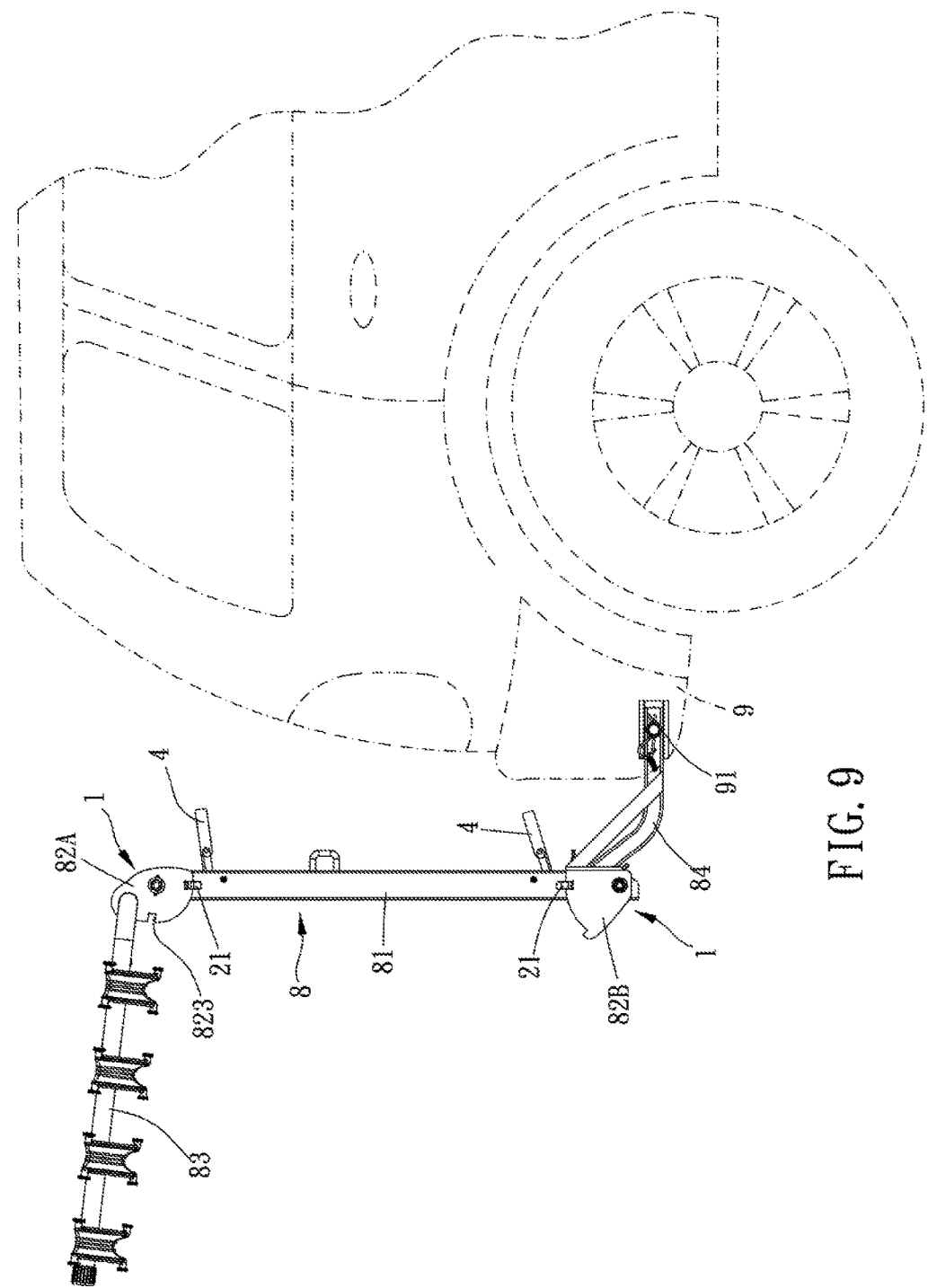
FIGS. 9 to 11 are drawings showing the preferred embodiment of the present invention in a folded state.
Figure 10:
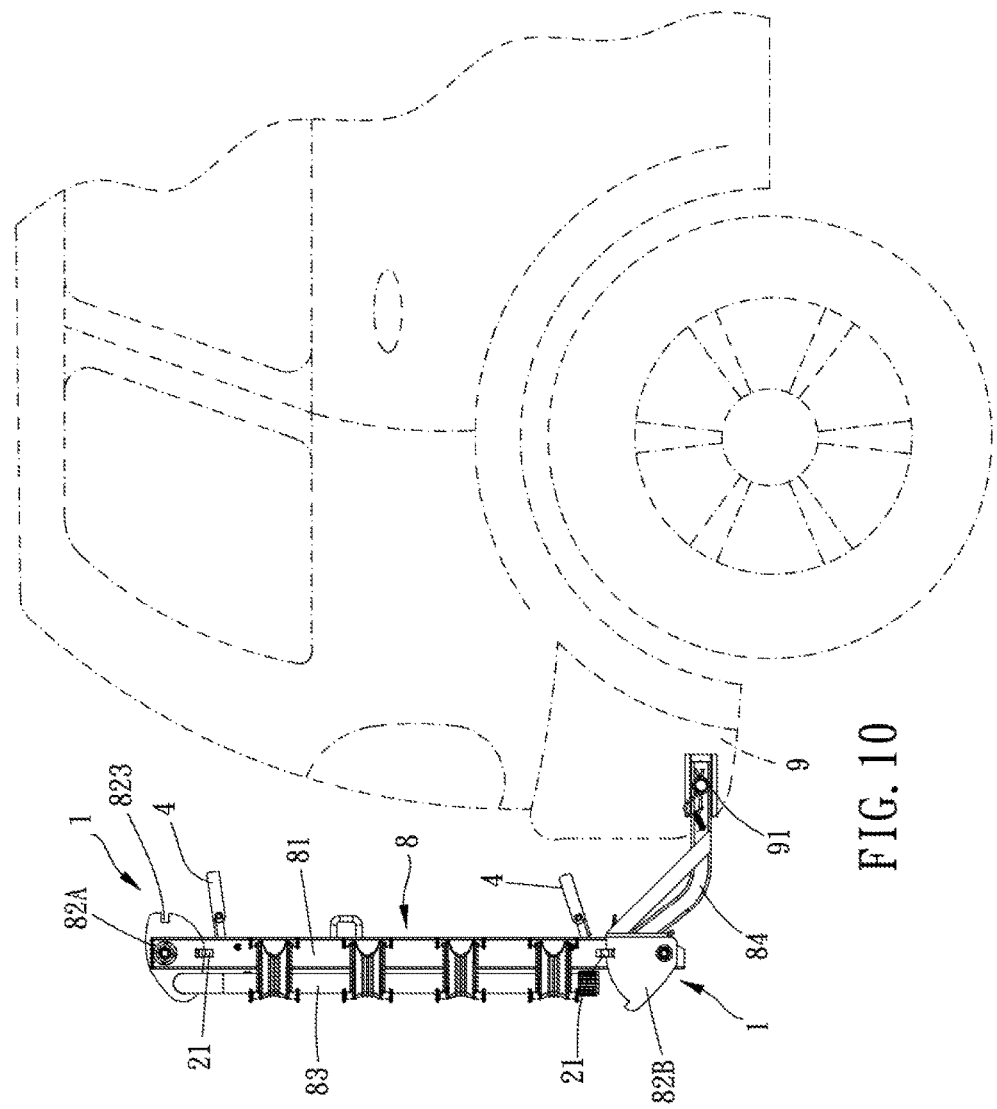
Figure 11:
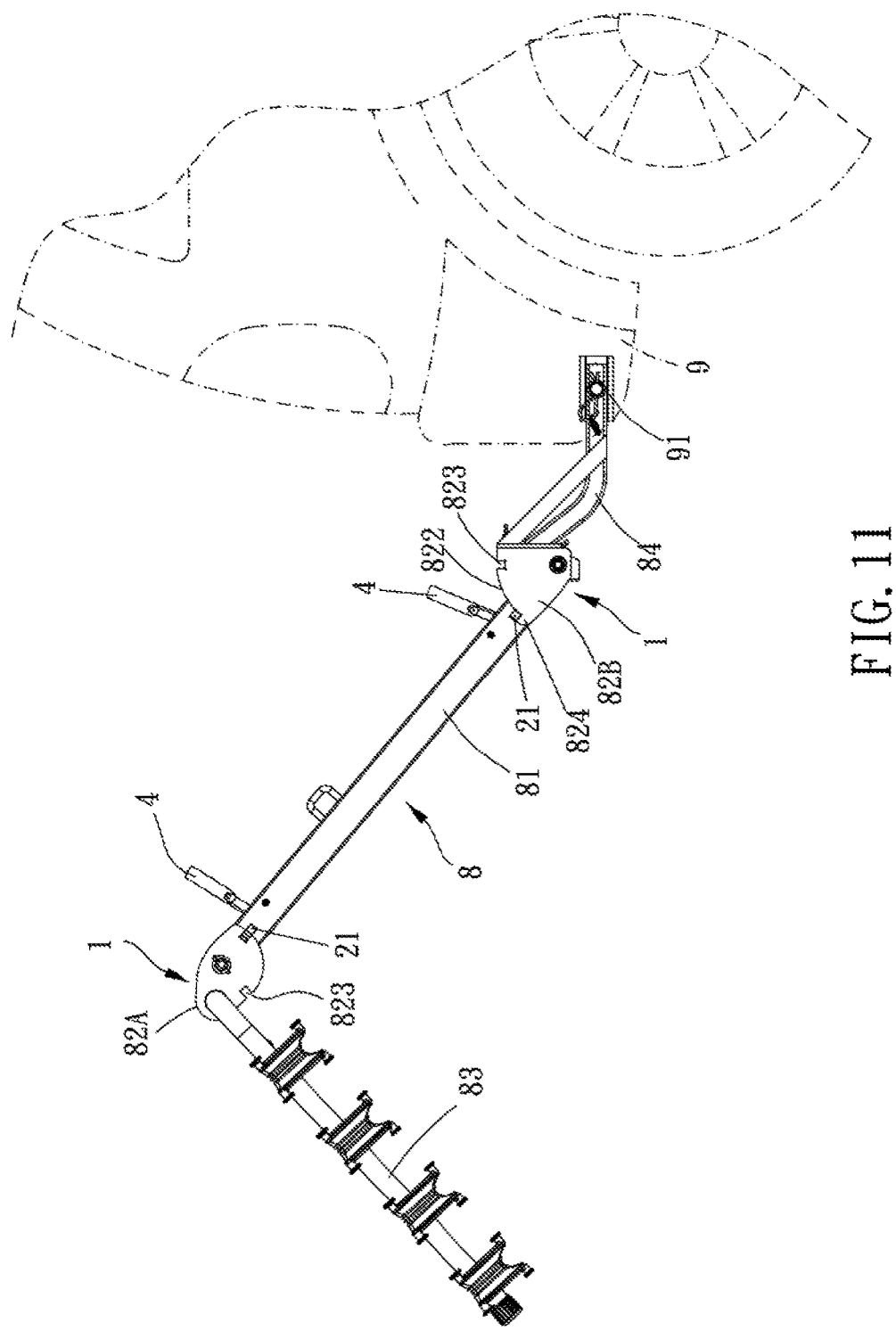

In this embodiment, the movable member 82B includes one said groove 823 and a blocking portion 824 located on an end of the curved section 822. When the movable member 82B swings relative to the fixing rod 81 to the positioning block 21 to abut against the blocking portion 824 (as shown in FIGS. 7 and 11), the fixing rod 81 in inclined, and the supporting rod 83 is inclined downward so that the user can disassemble the bicycle from the supporting rod 83 conveniently. After the bicycle is disassembled from the supporting rod 83, the user does not need to toggle the controlling member 42, and the fixing rod 81 and the movable member 82B are swingable relative to each other. When the positioning block 21 slides to a position corresponding to one said groove 823, the positioning block 21 is driven by the elastic assembly 3 to be received in the groove 823, and the fixing member 2 is positioningly restricted in the first position.

It is to be noted that in other embodiments, the bicycle rack 8 may include just one said foldable positioning structure 1, wherein only one said movable member 82A is proved with the foldable positioning structure 1, and the other said movable member 82B is not provided with the foldable positioning structure 1.

Given the above, in the present invention, when the controlling member is driven to move from the third position to the fourth position, the fixing member moves from the first position toward the second position, the fixing member is free of being restricted by the movable member, and the movable member is swingable relative to the fixing rod; when the controlling member is driven to move from the fourth position to the third position, the elastic assembly forces the fixing member to move from the second position to the first position to positioningly restrict the movable member, and the movable member and the fixing rod are non-swingable relative to each other. Therefore, via the foldable positioning structure, the movable member and the fixing rod can be folded and positioned quickly, and the bicycle rack is convenient to be stored and easy to be operated.

In addition, the elastic assembly can prevent the positioning block from being dislocated from the groove to prevent the fixing rod and the movable member from swinging relative to each other.

While we have shown and described various embodiments in accordance with the present invention, it should be clear to those skilled in the art that further embodiments may be made without departing from the scope of the present invention.

What is claimed is:

1. A foldable positioning structure for a bicycle rack, including:
    a fixing rod, configured to be a part of the bicycle rack;
    a movable member, configured to be a part of the bicycle rack;
    a fixing member, for being assembled to the fixing rod and being movable between a first position and a second position relative to the fixing rod;
    an elastic assembly, an end thereof being assembled to the fixing rod and the other end thereof being assembled to the fixing member so as to restrict the fixing member in the first position normally;
    a controlling assembly, for being assembled to the fixing rod and being movable between a third position and a fourth position relative to the fixing rod, the controlling assembly including a pivot member and a controlling member, an end of the pivot member being assembled to the fixing rod and the other end of the pivot member being pivoted to the controlling member, a free end of the controlling member being assembled to the fixing member;
    wherein when the controlling member is driven to move from the third position to the fourth position, the fixing member moves from the first position toward the second position, the fixing member is free of being restricted by the movable member, and the movable member is swingable relative to the fixing rod; when the controlling member is driven to move from the fourth position to the third position, the elastic assembly forces the fixing member to move from the second position to the first position to positioningly restrict the movable member;
    wherein the fixing member includes a positioning block, the fixing rod is formed with a slide slot penetrating therethrough, and the positioning block is slidably disposed in the slide slot.

2. The foldable positioning structure of claim 1, wherein the movable member includes a restriction portion, the restriction portion includes a curved section and at least two grooves formed on the curved section, when the fixing member is in the first position, the positioning block is received in one said groove to abut against the movable member and to positioningly restrict the movable member from swinging relative to the fixing rod; when the fixing member slides to the second position and is dislocated from one said groove, the positioning block abuts against the curved section, the movable member is free of being restricted by the positioning block so as to be swingable relative to the fixing rod, when the positioning block slides to another one of said grooves, the positioning block is driven by the elastic assembly to be received in the groove, and the fixing member is positioningly restricted in the first position.

3. The foldable positioning structure of claim 1, wherein the movable member includes a restriction portion, the restriction portion includes a curved section, the restriction portion further includes a groove and a blocking portion located on an end of the curved section.

4. The foldable positioning structure of claim 1, wherein the fixing member includes a reversed U-shaped block and a positioning block, two leg sections of the reversed U-shaped block are formed with an assembling hole respectively, and the two assembling holes communicate with each other for the positioning block to be disposed therethrough.

5. The foldable positioning structure of claim 4, wherein the pivot member is a connecting board, an end of the connecting board is pivoted to a portion between two ends of the controlling member, and the other end of the connecting board is pivoted to an inner wall of the fixing rod.

6. The foldable positioning structure of claim 4, wherein one of said ends of the elastic assembly is for being assembled to an end wall of an end of the fixing rod, the other of said ends of the elastic assembly is assembled to a connection section between the two leg sections of the reversed U-shaped block, the reversed U-shaped block is further funned with a fixing sheet perpendicular to the two leg sections, and a locking member locks the fixing sheet and the positioning block.

7. The foldable positioning structure of claim 6, wherein an end of the controlling member is located in the fixing rod and pivoted to the two leg sections of the reversed U-shaped block, and the other end of the controlling member extends outside the fixing rod.

8. The foldable positioning structure of claim 7, wherein the movable member includes a restriction portion, the restriction portion includes a curved section and at least two grooves formed on the curved section, when the fixing member is in the first position, the positioning block is received in one said groove to abut against the movable member and to positioningly restrict the movable member from swinging relative to the fixing rod; when the fixing member slides to the second position and the positioning block is dislocated from one said groove, the positioning block abuts against the curved section, the movable member is free of being restricted by the positioning block so as to be swingable relative to the fixing rod, when the positioning block slides to another one of said grooves, the positioning block is driven by the elastic assembly to be received in the groove, the fixing member is positioningly restricted in the first position, one of said ends of the elastic assembly is for being assembled to the end wall of an end of the fixing rod.

9. A bicycle rack, including the foldable positioning structure of claim 1, the bicycle rack further including:
    a second movable member, one of said movable members pivoted to one of two ends of the fixing rod and provided with a supporting rod for supporting a bicycle, the other of said movable members pivoted to the other of the two ends of the fixing rod and provided with a connecting rod, the connecting rod for being assembled to an assembling rod of an automobile.

10. The bicycle rack of claim 9, wherein the bicycle rack includes a second fixing member, a second elastic assembly and a second controlling assembly, the fixing member, elastic assembly and controlling assembly are disposed on the one end of the fixing rod, and the second fixing member, second elastic assembly and second controlling assembly are disposed on the other of the two ends of the fixing rod, and the fixing members, elastic assemblies and controlling assemblies are for folding and positioning the fixing rod and the two movable members.

\* \* \* \* \*